United States Patent [19]

Pooley

[11] Patent Number: 4,771,278
[45] Date of Patent: Sep. 13, 1988

[54] MODULAR LARGE-SIZE FORMING LAMP MATRIX SYSTEM

[76] Inventor: Charles Pooley, 6938 Calhoun Ave., Van Nuys, Calif. 91405

[21] Appl. No.: 889,907

[22] Filed: Jul. 28, 1986

[51] Int. Cl.[4] .............................................. H04N 5/66
[52] U.S. Cl. .................................... 340/780; 340/714; 340/767; 358/240
[58] Field of Search ............... 340/780, 766, 752, 714, 340/716, 795, 792, 799, 700, 701, 702, 703, 760, 767, 815.2; 358/240, 241, 59, 56, 169, 170; 315/105, 106, 107

[56] References Cited

U.S. PATENT DOCUMENTS

| | | | |
|---|---|---|---|
| 4,009,3335 | 2/1977 | Payne et al. | 358/240 |
| 2,999,127 | 9/1961 | Fisher | 358/170 |
| 3,594,762 | 7/1971 | Gardberg et al. | 340/760 |
| 3,827,042 | 7/1974 | Mandzsy et al. | 340/760 |
| 3,941,926 | 3/1976 | Slobodztan et al. | 358/240 |
| 4,063,234 | 12/1977 | Arn et al. | 358/240 |
| 4,134,132 | 1/1979 | Magos et al. | 358/240 |
| 4,194,215 | 3/1980 | Shionoya | 358/240 |
| 4,384,279 | 5/1983 | Fujita | 340/815.2 |
| 4,396,866 | 8/1983 | Bay et al. | 315/106 |
| 4,578,672 | 3/1986 | Oota et al. | 340/702 |

Primary Examiner—John W. Caldwell, Sr.
Assistant Examiner—Alvin Oberley
Attorney, Agent, or Firm—Keith D. Beecher

[57] ABSTRACT

A matrix display system including a unit made up of a plurality of modules, each module containing an array of incandescent lamps which provides a low cost assembly for displaying video images and messages. The unit also includes the necessary electronics to control the brightness of each lamp of the array in order to form images in response to a standard video signal. Relatively simple circuitry is provided for controlling the video sampling, lamp brightness levels, and lamp pre-heat power. All signals are digitized, and no adjustments are required in the display unit itself. Each lamp plugs into the display unit to facilitate replacements. The display unit is divided into a plurality of modules for rapid servicing, and to allow for the possibility of larger or smaller displays by using different numbers of modules.

8 Claims, 8 Drawing Sheets

SYSTEM BLOCK DIAGRAM

MODULE -103-

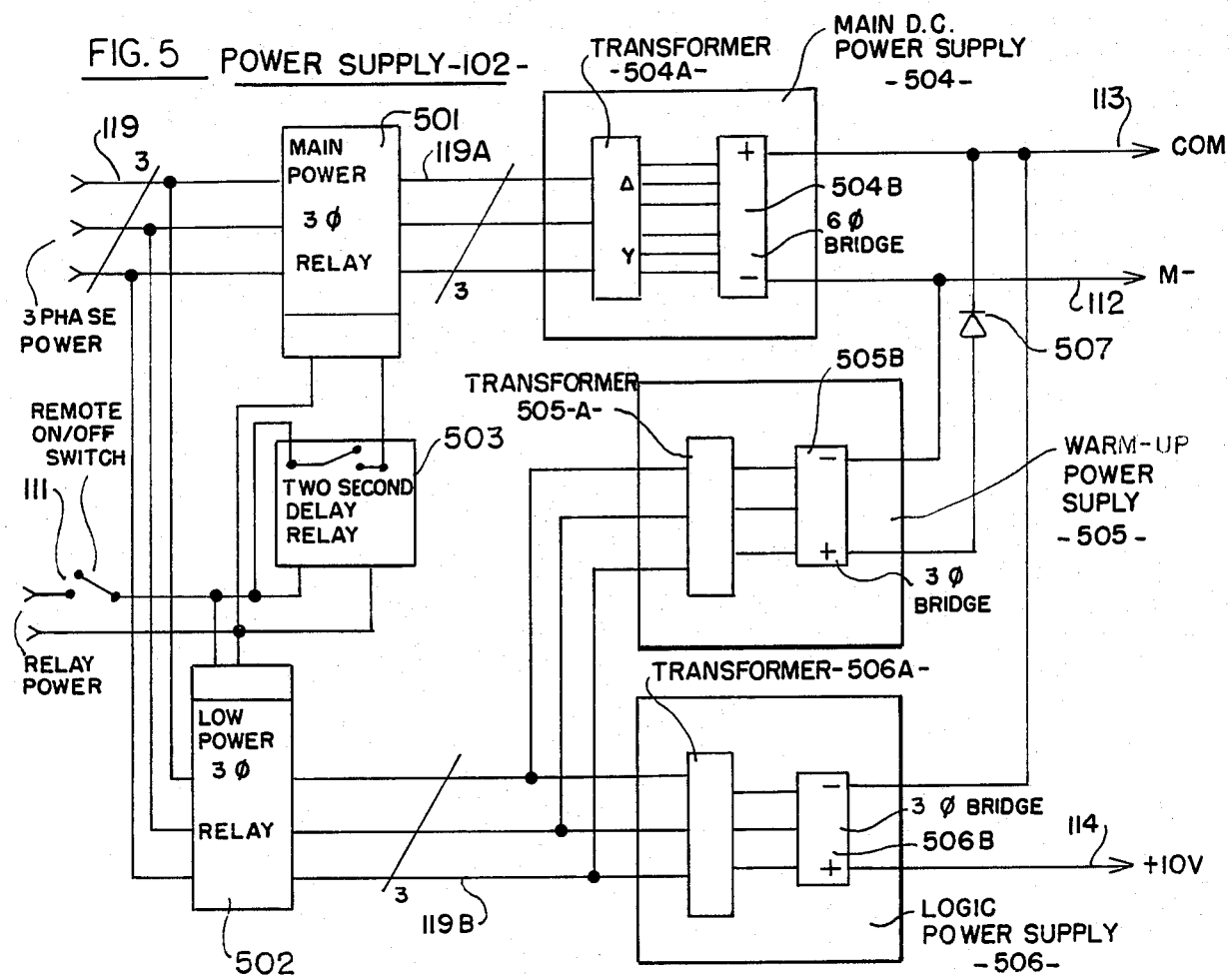
FIG. 5 POWER SUPPLY -102-
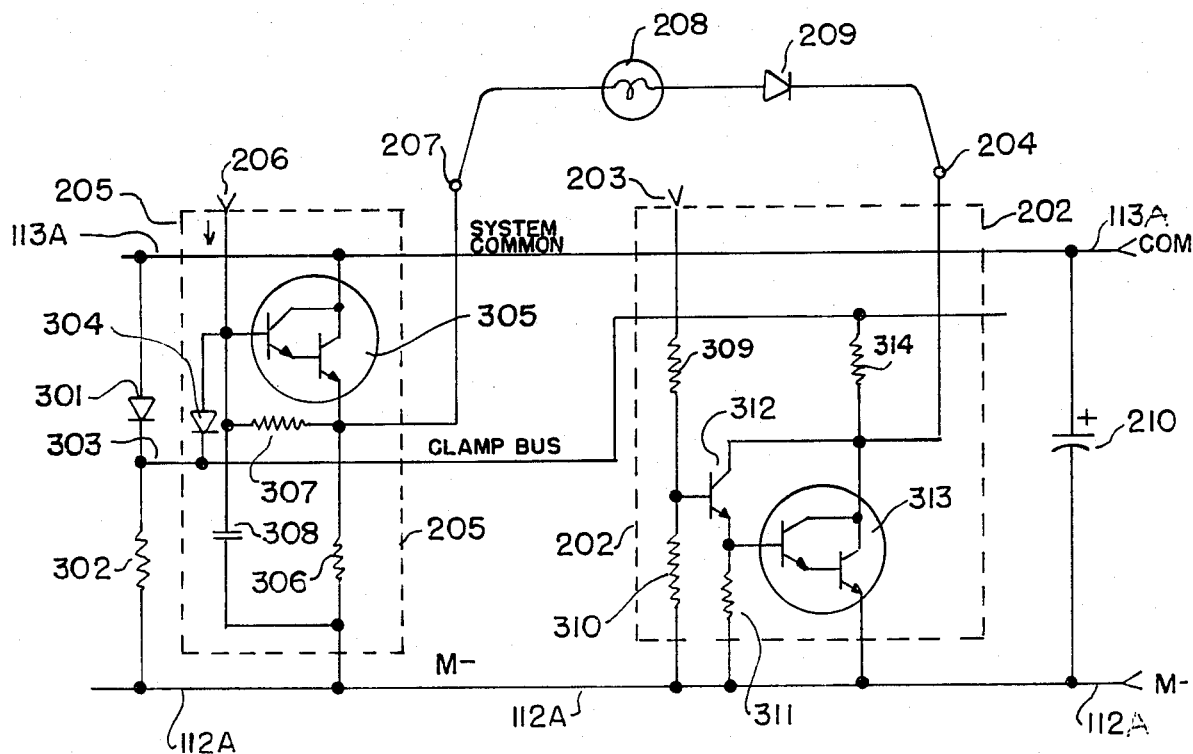
FIG. 3 ROW AND COLUMN LAMP DRIVERS - 202-, -205-

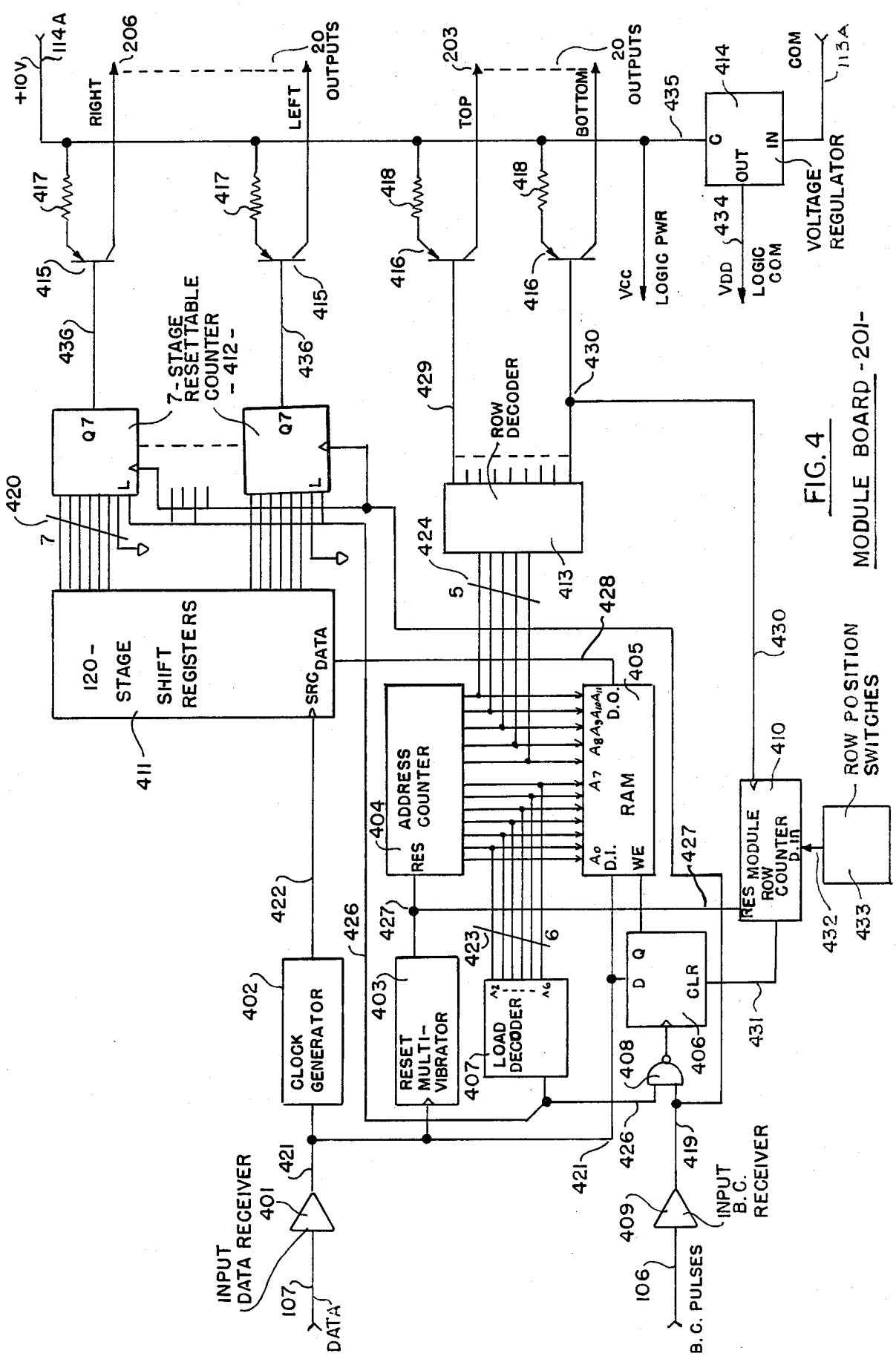
FIG. 4   MODULE BOARD -201-

VIDEO DIGITIZER -101-

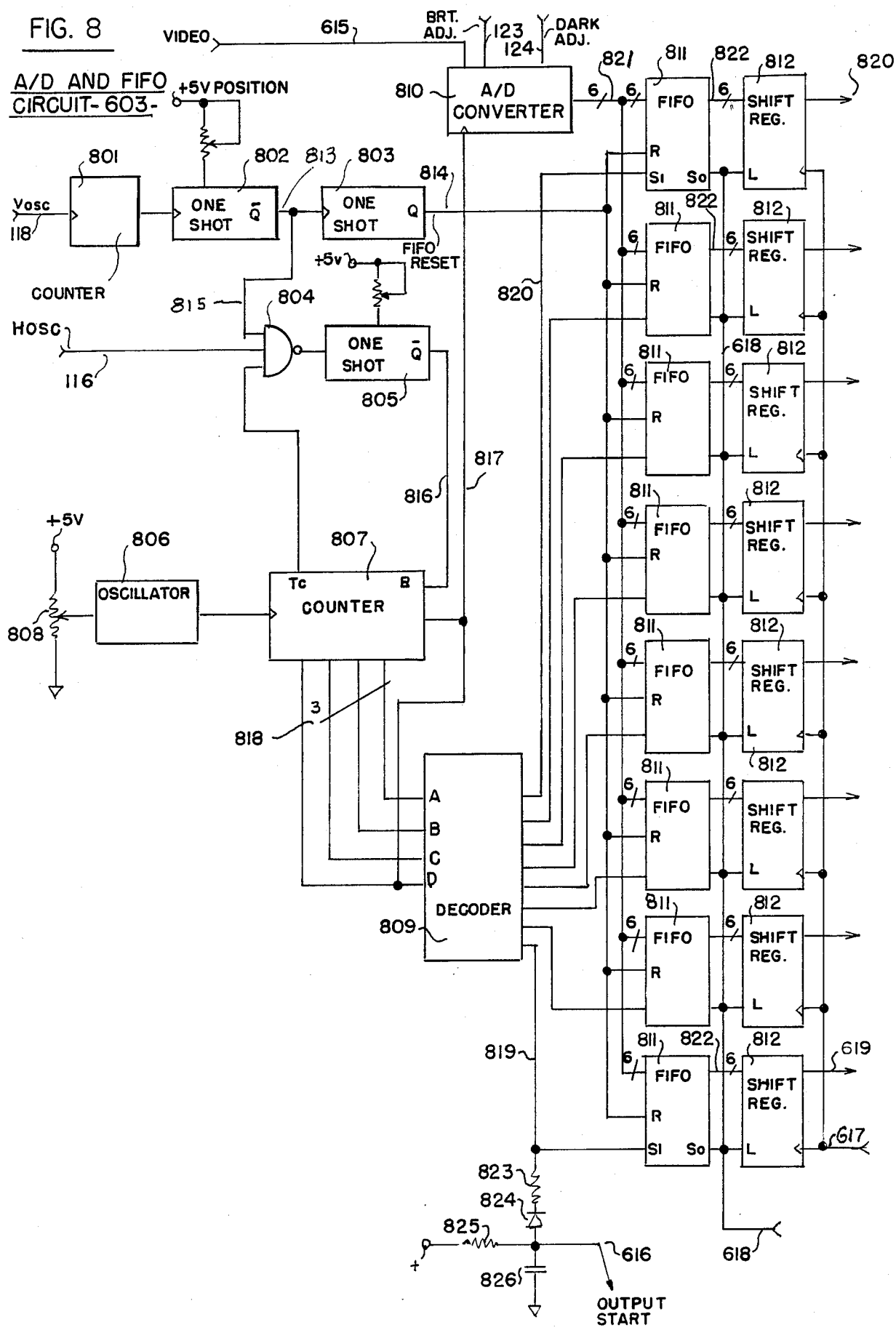

BRIGHTNESS CONTROL GENERATOR CIRCUIT -605-

MODULAR LARGE-SIZE FORMING LAMP MATRIX SYSTEM

BACKGROUND OF THE INVENTION

The present invention is concerned with an information display system capable of presenting video pictures and other forms of information on a display screen constituted by a number of lamp matrix modules.

In many present-day sports and entertainment facilities, large display screens are installed at elevated positions where they may be conveniently viewed by the audience. These screens serve not only to present standard sports scoreboard data, but also to provide instant replays, as well as slow motion and close-ups. These large display screens have also found a variety of other uses and applications including, for example, giant video games, views of patrons on a disco dance floor, music activated video effects, and so on.

Television projection systems have been used in the prior art to provide the large screen displays referred to above. However, the projection television information display system is unsuitable under daylight, or under outdoor lighting conditions where the ambient light level is high. To meet the requirements of a high intensity outdoor display screen viewable by a large audience, lamp matrices have been developed which are formed by a large array of standard incandescent lamps, the lamps being selectively controlled to display alphanumeric information and/or to produce pictorial video images whose picture elements are defined by the incandescent lamps of the array.

One commercially available incandescent lamp matrix display system is manufactured and sold under the trademark "Telescreen" by the Conrac Corporation. Similar systems are also manufactured and sold by the Stewart-Warner Company. These display systems, in each instance, include an array of incandescent lamps, each of which produces light of a controllable intensity, and each of which is capable of reproducing the gray shade scale of black and white broadcast television. The Stewart-Warner systems are described, for example, in U.S. Pat. Nos. 3,941,926 and 4,009,335. Similar systems are described in U.S. Pat. Nos. 4,194,215 and 4,134,132.

U.S. Pat. No. 4,063,234—Arn et al, for example, illustrates and describes a flat screen video display apparatus in which a plurality of addressale incandescent lamps are arranged in an X-Y matrix. The gray scale visual effect of the video information presented by the display is achieved by controlling the length of time of illumination of each of the lamps in the display. Each lamp is connected in series with a source of power and a switchable solid state device, such as an SCR or a transistor. The lamps are normally turned off. However, in the presence of a video signal above a predetermined threshold, the lamps are selectively turned on. Pulse width modulation is provided to control the gray scale visual effect of each lamp after it has been turned on.

An objective of the present invention is to provide a video matrix display system of the general type described above, but one which is modular in nature, and which utilizes an expandable array of incandescent lamps to provide a low cost version of the prior art displays. The modular display of the present invention may be used to provide the small size 10'×15' conventional display using 9,600 lamps; or the larger size 15'×20' conventional display using 19,200 lamps; or any other desired size merely by selecting the number of modules to be included in the display. The lamps used in the preferred embodiment are small, long life indicator types of from $\frac{1}{2}$-12 watt power. Each module may contain, for example, 400 lamps each, to allow for a variety of display formats and ease of servicing.

A video digitizer unit is included in the matrix display system of the invention, and this digitizer serves to convert any standard video signal into digital signals which selectively control the brightness of the incandescent lamps of the array. Since the video and control signals are digital, no adjustments are required for the display itself. The system to be described uses efficient switching techniques so that even with $\frac{1}{2}$ watt lamps, over 80% of the power is delivered to the lamps, minimizing cooling problems. The matrix display system to be described consists of a power supply, a video digitizer unit, and a modular display unit consisting, for example, of up to 48 modules, constructed to require a minimum of interconnections.

The main power supply is a simple 30-volt unregulated, three-phase rectifier type which requires no filter capacitors for maximum reliability. A secondary low current 10-volt supply is also included in addition to the 30-volt main supply. For a display using 900 milliwatt lamps, an average of 5 amps per module are required, or 240 amps for 48 modules. With such lamps, the three-phase power required is 208 volts at slightly over 15 amps. The power supply may be remotely switched on from the video digitizer unit.

Each module in the matrix display system to be described includes electronics incorporating appropriate drive circuitry, and a memory for its 400 lamps, which are arranged in twenty rows of twenty lamps each. In this way, and by using a multiplexed X-Y assembly, each drive transistor in the drive circuitry controls twenty lamps. The modules for the standard indoor system are, for example, 30"×30"×4", and weigh 19 pounds. The electronics consists of a driver board with all the switching and digital circuits mounted on that board; the driver boards with driver transistors; and two lamp boards with each lamp board being equipped with sockets for 200 lamps and mounting hardware. Replacement of a lamp, or lamp board, or complete module, is made simple for minimum downtime. There are only three power connections and a connector for the two digital signals required for each module.

It is to be understood, of course, that the foregoing specific numbers are for explanation purposes only, and are not intended to limit the invention in any way.

The video digitizer unit selects from three standard video signals, one to sample and digitize the signal to a sixty-four level code for transmission in real time to the lamp matrix of each module, together with a signal to adjust the brightness levels of the lamps for a proper approximation to the video gray scale. A dark level and white level adjustment is included to set the sixty-four levels of brightness to match the range of shades in the incoming video signal. A "freeze" mode is also provided, in which some of the video signals are stopped, allowing memories in the display to hold the image still.

The matrix display itself is formed as an array of the modules, arranged in an X-Y matrix, to provide economy of interconnections and parts included in the design of each module. The total number of signals required to drive the matrix is a function of its linear size, but not its area, so that even for a large number of lamps, the number of required signals is small. For example, the number of signals required to drive a single module is two; for twenty-four modules in a 10'×15' module display, the number of drive signals required is seven; for a forty-eight module system in a 15'×20' display, the required number of drive signals is nine to control 19,200 lamps. Regardless of displayize, there are only three power connections.

BRIEF DESCRIPTION OF TH DAWINGS

FIG. 3 is a circuit diagram of row and column driver circuits used in the module of FIG. 2;

FIG. 4 is a diagram, partly in block form, and partly in circuit detail of the electronics included in the module of FIG. 2;

FIG. 5 is a diagram, partly in block form, and partly in circuit detail of a power supply included in the system of FIG. 1;

FIG. 8 is an analog/digital and FIFO register circuit included in the digitizer unit of FIG. 6;

DETAILED DESCRIPTION OF THE ILLUSTRATED EMBODIMENT

Figure 1:
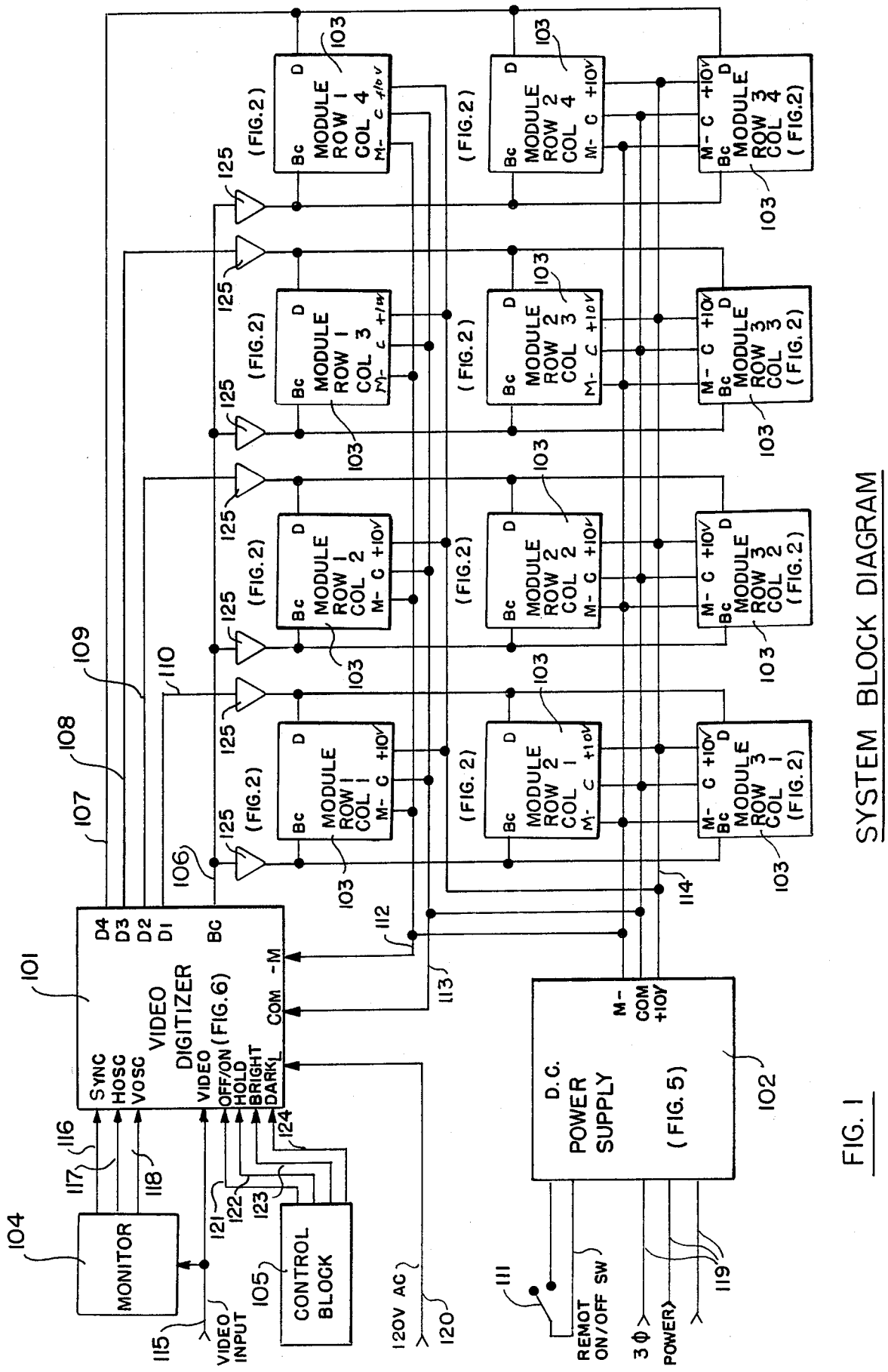
FIG. 1 is a block diagram of an overall modular video display system representing one of the embodiments of the invention.
Figure 2:
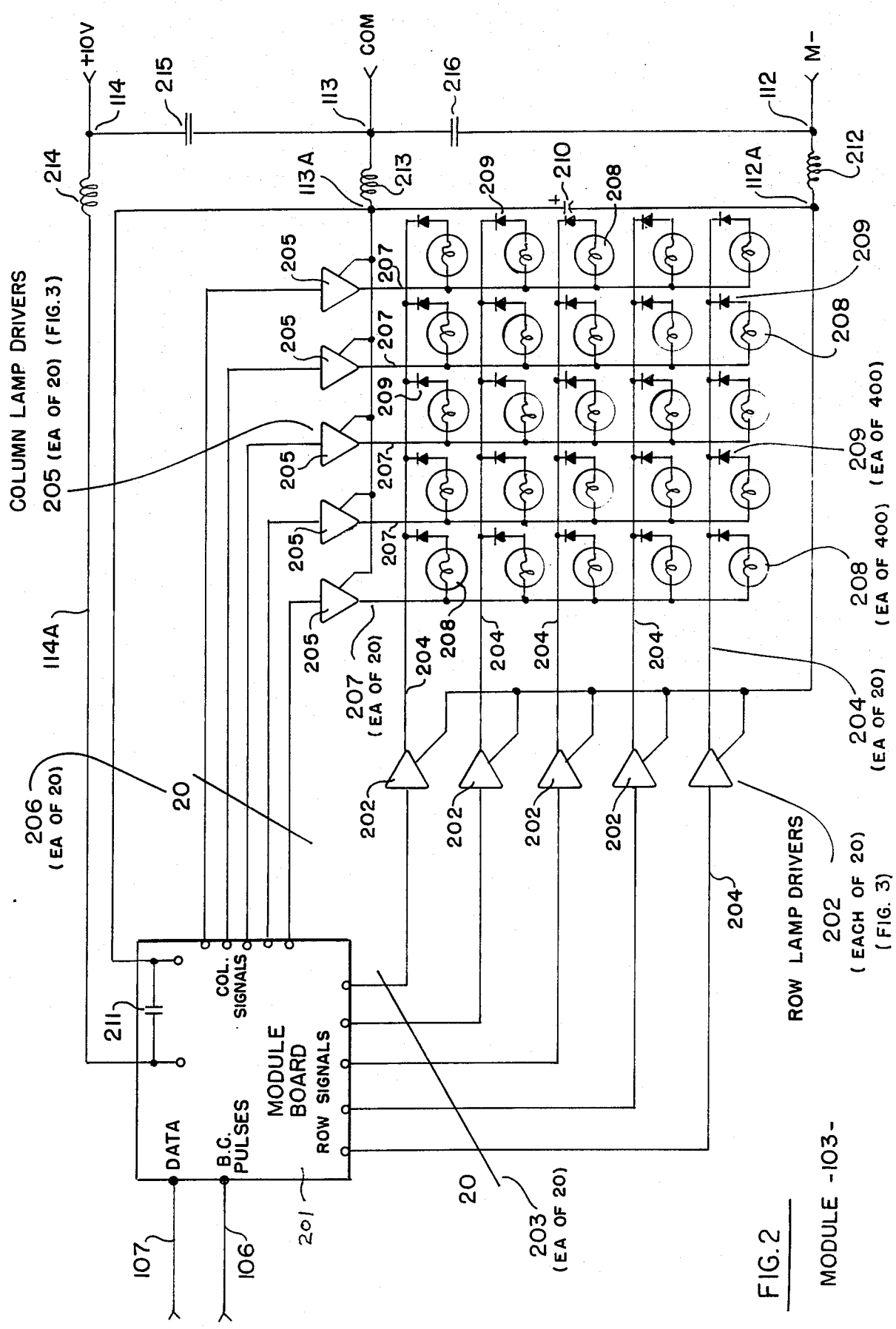
FIG. 2 is a diagram, partly in block form and partly in circuit detail of an individual module used in the system of FIG. 1.
Figure 6:
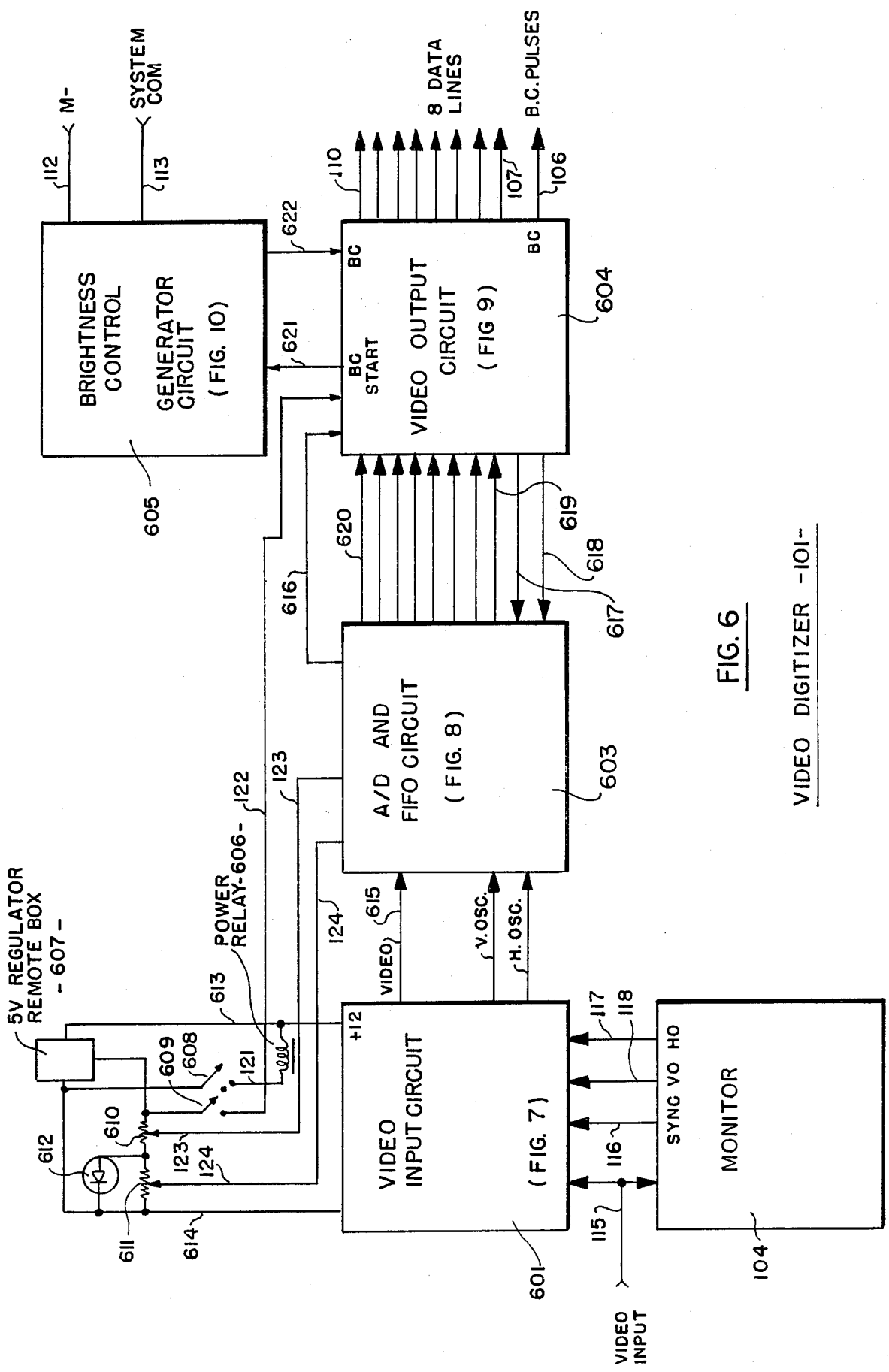
FIG. 6 is a diagram, partly in block form and partly in circuit detail of a video digitizer unit included in the system of FIG. 1.

As mentioned above, the matrix display system of the invention is made up of a plurality of modules 103 arranged in rows and columns. The columns receive respective data signals D1, D2, D3 and D4 over leads 110, 109, 108 and 107 from a video digitizer 101. The modules also receive a brightness clock (BC) from the video digitizer 101 over lead 106. Although the embodiment shown in FIG. 1 comprises 12 modules arranged in four columns and three rows, displays may be made up, for example, of up to eight columns and up to six rows for a total of 48 modules. Details of the individual modules are shown in FIG. 2, and details of the video digitizer are shown in FIG. 6, and these details will be discussed subsequently as the description proceeds.

The modules are powered by a direct current power supply 102, which will be described in more detail in conjunction with FIG. 5. Each module include an electronic section and an incandescent lamp array section. The power supply 102 delivers 10-volts DC for the electronic section of each module over terminals 113 and 114 designated respectively as common com and +10V. The com lead 113 and an M- lead 112 from the power supply are connected to the incandescent lamp arrays in the individual modules to provide power for the incandescent lamp arrays. As shown, the COM and M- leads 113 and 112 are also connected to the video digitizer 101. The power supply is turned on and off by a remote control switch 111,.

A monitor 104 is provided, and the monitor and video digitizer 101 receive a video signal input over lead 115. The video digitizer also receives sync signals, horizontal oscillator signals and vertical oscillator signals from the monitor 104 over leads 116, 117 and 118 in order to synchronize the matrix. The operation of the video digitizer 101 is continuous with a brief interruption occurring once or video frame, as will be explained.

Remote controls from a control block 105 are provided over lead 121 to turn the video digitizer on and off; over lead 122 to provide a hold control which when activated causes stoppage of new video data permitting a still picture to be displayed; over lead 123 to provide brightness control which sets the amplitude of the video signal to correspond with maximum lamp brightness; and over lead 124 to provide a dark level control which sets the amplitude of the video signal to correspond with minimum lamp brightness.

The video digitizer 101 is independently powered by a 120-volt alternating current introduced to the digitizer over lead 120. If the location of the video digitizer is sufficiently remote from the modules, buffer amplifiers 125 may be included to compensate for degraded signal strength from the video digitizer. Three phase power is supplied to the power supply 102 over leads 119.

As mentioned above, the components of the individual modules 103 are shown in FIG. 2. In the illustrated embodiment, each module comprises an independent 400 lamp array arranged in twenty rows of twenty lamps each. The lamps are activated by row and column buses 204 and 207 respectively. These buses, in turn, are driven by a set of twenty row drivers 202 and twenty column drivers 205. The drivers 202, in turn, are driven by input current signals from a module board 201 introduced by leads 203, and drivers 205 are driven by input current signals from the module board applied thereto over leads 206.

The module board 201 will be described in detail in conjunction with FIG. 4. This board operates from the data input signal ($D_4$) received over lead 107 (or one of the other data signals) and brightness clock (BC) received over lead 106, both of these signals being derived from the video digitizer 101 of FIG. 1.

All signals between the module board 201 and the lamp array are current source type, to minimize the effect of voltage transients which may occur on the common bus 113A of the lamp array and drivers.

Each intersection of a row bus 204 and a column bus 207 is connected to an incandescent lamp 208 in series with a rectifier diode 209.

Capacitors 211 and 215 and inductance coil 214 are provided to minimize transients propagated on the power supply lead +10 V114; and capacitors 210 and 216 and inductance coil 212 are provided to minimize transients propagated on the M- lead 112; and inductance coil 213 is provided to minimize transients propagated along the common lead 113. As shown, the module of FIG. 2 is connected to the +10 V, COM, and M- leads from the power supply 102 of FIG. 1, the leads being designated 114, 113 and 112 respectively. Lead 114 is connected through inductance coil 214 to lead 114A which constitutes the +10 volt supply to the module board 201. Lead 113 is connected through inductance coil 213 to lead 113A which represents the common bus to the module board 4 and to the lamp array. Lead 112 is connected through inductance coil 212 to lead 112A which constitutes the M- bus to the lamp array.

The row and column lamp drivers 202 and 205 of FIG. 2 are shown in circuit detail in FIG. 3, the row and column drivers 202 and 205 in FIG. 3 being shown as connected to one of the lamps 208 of the array of FIG. 2 through corresponding rectifying diode 209. It will be appreciated that similar circuitry is used for each of the row and column lamp drivers 202, 205 of FIG. 2. The common bus (COM) from the power supply 102 of FIG. 1 is connected to all of the drivers by way of bus 113A. The circuit also includes a clamp bus designated 303, and the M- bus 112A which is connected to the M- bus 112 from the power supply. The circuit also includes a diode 301 connected between the common (COM) bus 113A and the clamp bus 303, and a 1 kiloohm resistor 302 connected between the clamp bus 303 and the M- bus 112A. Capacitor 210 is connected between the common (COM) bus 113 and the M- bus 112.

Each column driver 205 includes a transistor 305 of the type designated 2N6388 which is connected as an emitter follower to drive an output to lamp 208 over lead 207 in response to a current input applied to lead 206. A 2 nanofarad capacitor 308 couples the lead 206 to the M- bus 112A to limit the rate of voltage increase or decrease to about 2.5 volts per microsecond. This serves to minimize radio frequency transients which have a tendency to radiate radio frequency energy. A 220 ohm resistor 307 is provided to cause about half the input signal to pass to capacitor 308 when the current is present, and drains from capacitor 308 about onehalf the input current value when the input current is zero. This is because the voltage from base to emitter of transistor 305 is relatively constant at about 1.4 volts, so that positive and negative rate of change of voltage at the base can be nearly equal.

A 1 kilo-ohm resistor 306 provides a load connecting the output of transistor 305 to the M- bus 112A, even when the voltage has decreased to a point where little current an flow through the lamp 208 and diode 209.

A diode 304 is provided to clamp the base voltage of transistor 305 to a value roughly equal to the voltage on the comon bus 113A by means of the clamping bus 303 which is about 0.8 voltages minus relative to the common bus 113A. This prevents saturation of the transistor and resulting stored charge inside, which would slow by an unpredictable amount the turning off of the driver.

The row drivers 202 each use a Darlington transistor 313 of the type designated 2N6283 of high peak current capability, and which is driven by a row driver input transistor 312 which may be of the type designated 2N6718. The transistor serves to conduct the current to twenty lamps 208.

A pair of resistors 310 and 309, which have respective values of 330 ohms and 470 ohms, apply and remove input signal current received over lead 203 to the transistor 312; and a 100 ohm resistor 311 assists in turning off the Darlington transistor 313. The Darlington trnsistor 13 prevented from saturating by not allowing its base voltage to exceed its collector voltage by the connection of transistor 312. Transistor 312 does saturate when the input is present. However, it does not produce undesirable storage charge effects because the transistor 312 is of the type with small storage capabilities, such as a switching transistor.

A 68 ohm resistor 314 forms a load for when the voltage on bus 204 becomes high enough so little current flows through the twenty lamps 208, and its function is to assist in completely turning off the Darlington transistor 313.

The module board 201 of FIG. 2 is shown in logic detail in FIG. 4. This board contains the electronic circuits which operate the lamps 208 of module 103 of FIG. 2, from the two input signals designated DATA and BC received respectively over the leads 107 and 106. Lead 107 is connected to an input data receiver 401, and lead 106 is connected to an input BC receiver 409.

The input data receiver 401 is connected over a lead 421 to a clock generator 402 which supplies clock signals to a 120-stage shift register 411 over a lead 422. Lead 421 is also connected to a multivibrator 403 which serves as a oneshot timer to provide a frame reset signal to an address counter 404. Address counter 404 is connected to a random access memory (RAM) 405 which may be a 4096×1 bit static memory. Lead 421 is also connected to a D flip-flop 406 which controls the Hold Function of the system.

The output of the BC receiver 409 is connected to a "nand" gate 408 by means of a lead 419. The shift register 411 is connected to a set of twenty 7-stage resettable counters designated 412, which is made up of a number of flip-flops lead 419 is also connected to resettable counters 412.

Address counter 404 is also connected to a load decoder 407, and it supplies a 6-bit input signal A2-A6 to the load decoder. The load decoder introduces a load signal to the L terminals of resettable counter 412, and to "nand" gate 408. The D flip-flop 406 introduces a frame reset signal to pin WE of RAM 405. RAM 405 introduces memory data output to the shift registers 411 over lead 428.

A row decoder 413 is connected to the address counter 404, and it produces each of first nineteen row output signals on leads 429; and the 20th and last row output signal over lead 430 to each of twenty row output transistors 416 which produce outputs on the leads 203 of FIG. 2. Each transistor has its emitter connected to the +10 volt lead 114A through a resistor 418.

Likewise, the flip-flops making up the 7-stage reset table counter 412 are connected to column output transistors 415, which supply the column outputs on the leads 206 of FIG. 2. Each of the transistors 415 has a resistor 417 connecting its emitter to the +10 volt lead 114A. The voltage regulator 414 is connected to the common (COM) lead 113A. It supplies a regulated output to the logic common by way of lead 434. The C terminal of the regulator is connected to the +10 volt lead 114A by lead 435, and it serves also as $V_{cc}$, or logic power.

As stated above, the module board 201 of FIG. 4 contains the electronic circuits which operate the lamps 208 of FIG. 2 in response to the data and BC input signals. The conversion of data to pulse widths is accomplished by the 120 stage shift register 411, and by the set of 20 resettable counters 412. These counters drive transistors 415 to produce outputs on the leads 206 in the form of current pulses of various durations.

Each counter 412 has six of seven input bits connected to six outputs of register 411. The seventh, most significant, bit is connected to logic common. Upon being preset, each terminal Q7 sets its corresponding lead 436 to logic "0", and remains at logic "0" until the count of clock pulses received over lead 419 exceeds the binary number of the six bits entered into each stage of the counter. The output on lead 436 then becomes logic "1", and it ends the output current pulse from the corresponding transistor 415. The six-bit number entered into each stage of the counter is 64 minus the predetermined number of clock pulses desired to end the corresponding output pulse. The number of clock pulses presented over lead 419 are always greater than 63 and less than 127 starting after the loading of the counters 412. These pulses are generated in the video digitizer 101 of FIG. 1, as will be discussed later in conjunction with FIG. 6.

The random access memory 405 has, for example, a 4096 bit capacity, of which 2400 bits contain the data to provide a 6-bit control for each of the lamps 208 of FIG. 2. The memory is addressed by counter 404, which is also connected to load decoder 407 and row decoder 413 to coordinate the various functions.

The 20th row signal on lead 430 from the row decoder 413 clocks the module row counter 410 which, by an output on lead 431 enables flip-flop 406 to store the value of the data received on lead 421, when the data is clocked through gate 408 by the BC signal on lead 419, upon the occurrence of the load signal on lead 426. In this way, whether or not the memory is to receive a new set of data is determined by input data during the time permitted by row counter 410. The counter 410 is preset once for each video frame by the frame clear signal received over lead 427, with a number which is set by binary switch 433 and received over leads 432. The binary value of the setting of switch 433 represents the point following frame clear at which new data can be entered. This number is usually set to 1 for the top row of odules, 2 for the second row, and so on.

The row decoder 413 has 20 outputs appearing on leads 429 and 430, which become logic "0" in succession as determined by five bits (A8–A11) of address counter 404. These provide current pulses at outputs 203 by way of transistors 416 and associated resistors 418. The load decoder 407 operates in response to six bits A2–A6 from address counter 404 to provide a load pulse on lead 426 which follows each set of 120 bits of data on lead 428 clocked from RAM 405 into the shift registers 411. The one-shot multivibrator 403 produces a frame clear pulse on lead 427 whenever the data on lead 421 ceases for a period of more than 200 microseconds. This occurs once per video frame following each second vertical synchronizing pulse, as will be explained subsequently.

Voltage regulator 414 provides regulated voltage for the integrated circuits of the system on lead 114A. The input for the regulator is system common (COM) lead 113A. This regulator input terminal constitutes a current source so that momentary changes in the voltage between leads 114A and 113A do not adversely affect the circuit. Accordingly, connections from the module board to the lamp drivers and module power are currents which are independent of voltage transients.

The power supply of FIG. 5 consists of three independent direct current power supplies 504, 505 and 506. Power supply 504 is the main direct current power supply, power supply 505 is the warm-up power supply, and power supply 506 is the logic power supply. Each of the three power supplies includes a transformer represented by respective blocks 504A, 505A, 506A, and rectifying bridge networks 504B, 505B, 506B. Bridge networks 505B and 506B are three-phase networks, and bridge network 504B is a six-phase network. The three power supplies operate from three-phase relays 501 and 502. Relay 501 is operated by a two second delay relay 503, so that relay 501 is activated two seconds later than relay 502 pon the closing of the remote on/off switch 111. Delay relay 503 opens immediately upon opening switch 111 and closes two seconds after switch 111 is closed.

The three direct current power supplies are connected so that the warm-up power supply 505 provides a relatively low voltage for the matrix when the main power supply 504 is off, and this occurs for the first two seconds after switch 111 is closed. Diode 507 blocks current from the warm-up power supply when the main power supply 504 is energized, and when its voltage exceeds the voltage of the warm-up power supply 505. The logic power supply 506 provides +10 volts on lead 114 relative to the common lead (COM) 113 for the module boards 201 (FIGS. 2 and 4) of the matrix.

During turn-on of the power supply the M- voltage on lead 112 is initially about one-quarter of the operating voltage. his allows the incandescent lamp filaments of the lamps 208 of FIG. 2 to warm up in such a manner that the lamp drivers 205 and 207 are not damaged by excessive current flowing through the cold tungsten filaments of the lamps.

The video digitizer 101 of FIG. 1 is shown in detail in FIG. 6. It includes a video input circuit 601 in more detail in conjunction with FIG. 7. The video digitizer also includes an analog/digital and FIFO register circuit 603 which will be described in more detail in conjunction with FIG. 8; and the video digitizer includes a video output circuit 604 which will be described in more detail in conjunction with FIG. 9. In addition, the video digitizer of FIG. 6 includes a brightness control generator circuit 605 which will be described in more detail in conjunction with FIG. 10. The monitor 104 (FIG. 1) is connected to the video input circuit 601.

Video input signals appearing on lead 115 are applied to monitor 104 and to video input circuit 601. The monitor supplies composite sync signals to the video input circuit over lead 116, horizontal oscillator signals to the video input circuit over lead 117, and vertical oscillator signals to the video input circuit over lead 118. The video input circuit supplies composite sync signals over lead 116 to the analog/digital converter 603, as well as vertical oscillator circuit signals over ead 118, and video signals over lead 615. The video input circuit 601 also supplies a DC voltage to a 5-volt regulator in remote box 607, and to the coil of a power relay 606. The contacts of relay 606 form switch 111 in FIGS. 1 and 5.

The analog/digital converter 603 accepts a white level adjustment signal from the wiper of a white level potentiometer 610 over lead 123, and a dark level adjustment signal from the wiper of a dark level potentiometer 611 over lead 124. The video input circuit also supplies the common voltage to lead 614 which is connected to regulator 607, and to the potentiometer 611, and through a red light emitting diode 612 to the junction of potentiometers 610 and 611. Switch 608 is the remote power on/off switch, and switch 609 is the "hold" switch. Switch 608 is connected to regulator 607 and to the coil of relay 606, and switch 609 is connected to regulator 607 and to the video output circuit 604. The analog/digital converter 603 supplies an output start signal to the video output circuit 604 over lead 616.

Monitor 104 is a conventional unit, and the three signals normally produced in the prior art monitors are made available to the video input circuit 601. These signals are the composite sync signal produced on lead 116; the vertical oscillator signal, which corresponds roughly to the vertical sync of the video signal, produced on lead 118, and the horizontal oscillator signal, which corresponds roughly with the horizontal sync, produced on lead 117. Changes involving equalizer pulses, and the like, which are normall present in the vertical sync, do not appear in the vertical oscillator signal.

The video input circuit 601 will be described in detail in FIG. 7. This circuit serves to establish accurate direct current restoration for the video signal, and it causes the black portion of the video to be established at zero volts relative to signal COM. Moreover, by means of an automatic gain control circuit the maximum white of the video signal is maintained at the 3 volt level for presentation to the analog/digital converter 603.

The analog/digital converter and FIFO register circuit 603 will be described in conjunction with FIG. 8. It loads the digitized video for each second horizontal video line into a set of FIFO memory registers so that the data is held in the registers as 20 successive 6-bit resolution samplings of video,. This enables information from up to eight FIFO registers to be delivered simultaneously to the video output circuit 604.

The video output circuit 604 will be described in conjunction with FIG. 9. It controls the shifting of the data out of the FIFO registers. The video output circuit also starts the brightness control generator 605; and it combines the brightness control pulses from the brightness control generator, and the hold signal received on lead 122,.with the data outputs 110, 107, etc.

The brightness control generator 605 will be described in detail in conjunction with FIG. 10. This circuit generates a series of pulses through the videc output circuit 604 on lead 106. These pulses serve to advance the pulse width counters 412 in FIG. 4, and they control the video hold flip-flop 406 in FIG. 4. The rat of the first sixty-four of the pulses generated by generator 605 is non-linear with time. This is to make the pulse width with respect to input video voltage a function of lamp brightness. The light output of an incandescent lamp is highly non-linear with respect to applied power because of the spectral shift characteristics of the filament at different temperatures.

Figure 7:
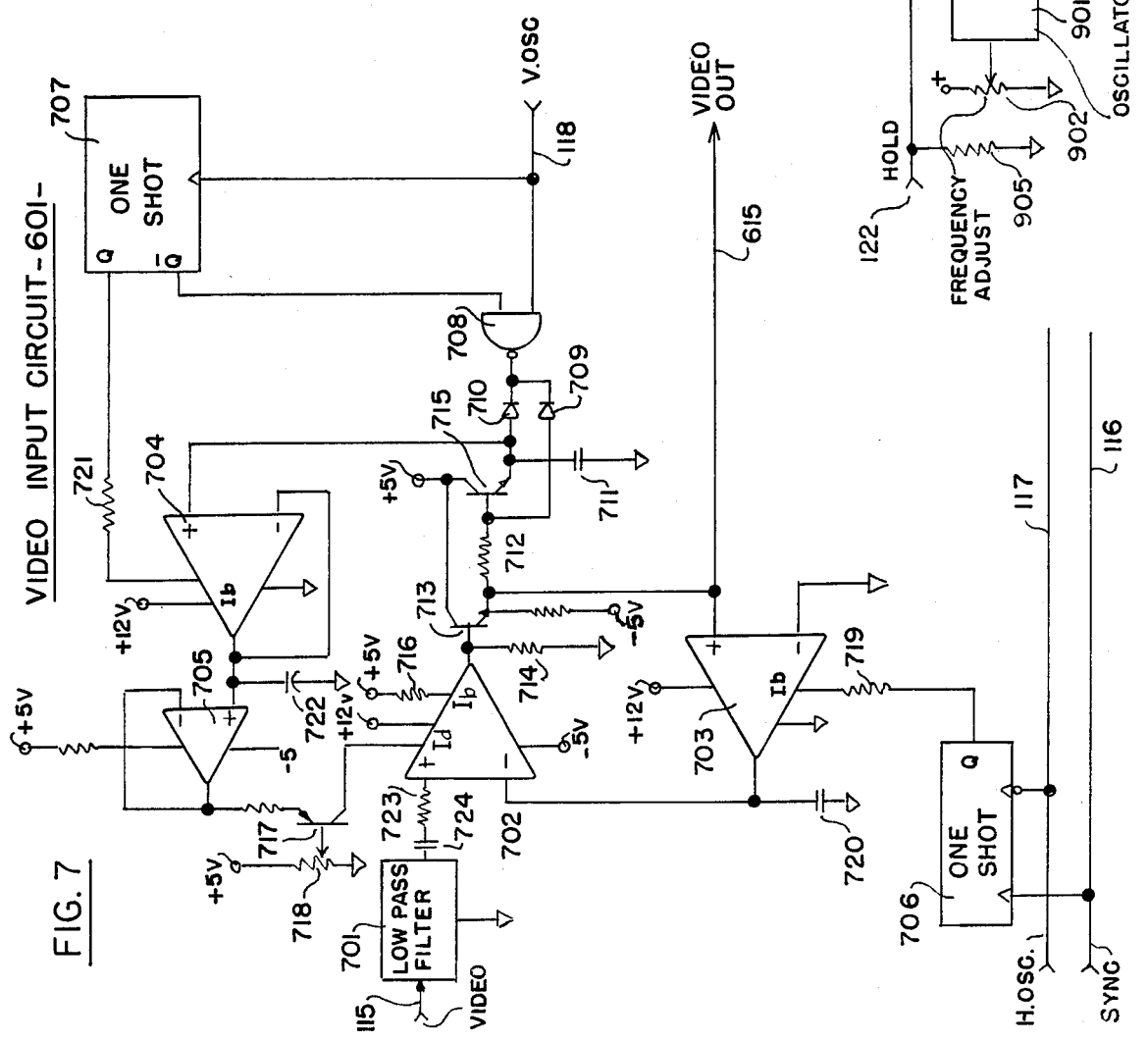
FIG. 7 is a circuit diagram of a video input circuit included in the video digitizer of FIG. 6.

As stated above, the video input circuit 601 of the video digitizer 101 of FIG. 6 is shown in greater detail in FIG. 7. The video input circuit includes a 2 megahertz low-pass filter 701 which is coupled through a direct current blocking capacitor 724 and through a resistor 723 to an operational amplifier 702. The output of the operational amplifier is connected to an NPN transistor 713. Transistor 713 is connected to an NPN transistor 715 which, in turn, is connected to a second operational amplifier 704. The output of operational amplifier 704 is applied to an operational amplifier 705, whose output is introduced to a PNP transistor 717 for automatic gain control purposes. The base of transistor 717 is connected to the wiper of a potentiometer 718 wich serves as the white level adjustment control. The emitter of transistor 713 is connected to lead 615 which carries the output video. The vertical output from the monitor 104 on lead 118 is introduced to a 100 microsecond one-shot 707. The $\overline{Q}$ output of the one-shot is connected to a "nand" gate 708, as is the lead 118. The output of "nand" gate 708 is connected through a pair of diodes 709 and 710 to the positive input of operational amplifier 704.

The emitter of transistor 713 is also connected to the positive input of an operational transconductance amplifier 703 whose output is connected to the negative input of operational transconductance amplifier 702 and to a grounded capacitor 720. The Q output of the one-shot 707 is connected to a resistor 721 to operational transconductance amplifier 704, and the Q output of a one microsecond one-shot 706 is connected through a resistor 719 to operational amplifier 703. The sync signals on lead 116 are introduced to one input of one-shot 706, and the horizontal oscillator signals on lead 117 are introduced to a second input of one-shot 706.

The video input circuit 601 limits the bandwidth of the incoming video so that high frequency components, such as chroma in color video, are prevented from producing aliasing or beating effect with the approximately three million samples per second digitizing rate of the analog/digital converter 603 of FIG. 6. The video input circuit 601 also claps or sets to zero the portion of the video called the "back porch" which corresponds to the darkest level of the picture, and by means of an automatic gain control amplifier adjusts the output video amplitude so that the lightest portions of the picture are set to about three volts, as mentioned above.

The video signal on lead 115 passes through filter 701 which is an elliptical or Chebychev filter, and which serves to pass componnts of frequency less than 2 megahertz. The video output from filter 701 is then passed through the direct current blocking capacitor 724 and resistor 723 to the positive input of a variable gain amplifier 702. The negative input of amplifier 702 is maintained at a predetermined direct current potential by amplifier 703 which is a sample-and-hold amplifier. Amplifier 703 compares the instantaneous video voltage with zero.volts during a time mediately following the end of each horizontal sync pulse, as determined by the one-shot 706 which is driven by the composite sync signal on lead 112 and horizontal oscillator signal on lead 117.

As a one microsecond pulse is applied through resistor 719 to the Ib input of amplifier 703, capacitor 720 is charged or discharged until the video voltage is zero at that time. Between pulses, the output of amplifier 703 neither charges nor discharges capacitor 720.

The amplifier 702 has an Id input which reduces its input impedance when a current is fed to it, so that the gain of the amplifier for a signal passing through resistor 723 is reduced. The output of amplifier 702 is a current proportional to the voltage difference between the + and − inputs divided by the current fed into Id. Resistor 714 serves as a load resistor, and it converts the output current to a voltage which is applied to transistor 713. Transistor 713 is an emitter follower transistor, and it provides a relatively low impedance video output for the driven elements.

Resistor 712, transistor 715 and capacitor 711 form a peak detecting circuit which stores a voltage in the capacitor representing the maximum white portion of the video signal which occurs after each vertical oscillator pulse on lead 118. Diodes 709 and 710, gate 708, and one-shot 707 cause capacitor 711 to be discharged at a time approximately 100 microseconds following the start of each vertical oscillator pulse on lead 118.

Amplifier 704 is a sample-and-hold amplifier, and it stores in capacitor 722 the voltage on capacitor 711 just before capacitor 711 is discharged by a pulse from one-shot 707. The Q output of one-shot 707 is fed through resistor 721 to the Ib input of amplifier 704. The voltage on capacitor 722 represents the peak white value of a video frane produced following each vertical sync. This voltage, on capacitor 722 is buffered by voltage follower amplifier 705. Amplifier 705 causes transistor 717 to conduct when the voltage across capacitor 722 is suffiiently greater than the base voltage as set by potentiometer 718. Current through transistor 717 passes to the Id input of amplifier 702 to form an AGC loop which provides a constant maximum video output established by the setting of potentiometer 718.

The A/D and FIFO register circuit 603 of FIG. 6 is shown in more detail in FIG. 8. The circuit of FIG. 8 includes a −2 counter 801 which is connected to a one to five milli-second adjustable one-shot 802. The $\bar{Q}$ output of one-shot 802 is connected to a 1 microsecond one-shot 803 whose Q output is connected to the reset inputs of a group of FIFO registers 811.

The $\bar{Q}$ output of one-shot 802 is also connected to a three input "nand" gate 804 over lead 813 to provide the V position signal to the "nand" gate. The output of "nand" gate 804 is connected to a one to ten microsecond adjustable one-shot 805. The $\bar{Q}$ output of the one-shot supplies the horizontal position signal to reset counter 807 over lead 816. The counter output is supplied to the "nand" gate 804 over lead 815. The horizontal input is also applied to the "nand" gate over lead 116.

Adjustable frequency oscillator 806 is connected to a width adjustment potentiometer 808 and to counter 807. The setting of potentiometer 808 determines the video sampling rate and picture width.

Decoder 809, which is the shift-in circuit for the FIFO registers has its inputs connected to counter 807 over leads 818. These leads receive the 3-bit binary counter outputs which serve to select the outputs from the decoder to control the sequential activation of the FIFO registers 811. The counter 807 also supplies a clock to the decoder 809, and to an analog/digital converter 810 over lead 817. Converter 810 is also connected to the FIFO registers 811 over lead 821 and it supplies the digitized 6-bit video signal to the FIFO registers over the lead. The row brightness adjustment signal and dark level adjustment signal are applied to the analog/digital converter 810 over leads 123 and 124 from the network shown in FIG. 6. The decoder 809 supplies the shift-in clock for the right-most FIFO register over lead 819, and the shift-in clock for the other FIFO registers over leads 820, sequentially with the left-most FIFO being clocked first. Each of eight 6-bit FIFO register outputs appear on leads 822.

The FIFO register shift-out and load signal is applied to the network over lead 618 (see also FIG. 6). The serial data to the right-most output circuit appears on leads 619, and the serial data to the lefllt-most output circuit appears on leads 620.

The A/D and FIFO register circuit 603 of FIG. 8 digitizes the video signal received from video circuit 601 over lead 615, and it distributes the 6-bit video sampled signals among each of the eight FIFO registers 811. Accordingly, each FIFO register sotres twenty consecutive video samples along consecutive segments of the picture portion of each second video horizontal line.

The process is halted after each second vertical sync pulse for a time to establish the start of sampling, which is the top of the displayed position, this being achieved by adjustable one-shot 802. One-shot 803 provides a pulse on lead 814 at the beginning of the vertical position pulse on lead 813 to reset or clear data from all the FIFO registers 811.

Oscillator 806, counter 807 and decoder 809 generate the sequential series of clock pulses to operate the FIFO registers and the A/D converter. The data, in the form of 6-bit words, is clocked from the FIFO registers into the parallel-serial registers 812 by the shift-out clock on lead 618, and the ata present in the registers 812 is shifted out in serial form by SRC pulses on lead 617. The resulting concurrent 120-bit streams of data represent the data to operate each vertical column of modules of the display of FIG. 2. The data for the left-most column appears on lead 620, and the data for the right-most column appears on lead 619.

The A/D and FIFO register circuit 603 also includes; a resistor 823, a diode 824, a resistor 825, and a capacitor 826. These elements produce an output start signal on lead 616 of FIG. 6. An output start signal on lead 616 is used to initiate each cycle of operation of the output circuit 604 which will now be described in conjunction with FIG. 9. Differential line drivers 908A-908H supply data on the eight data lines 107-110 of FIG. 6. The circuit also includes a differential driver 908J which supplies the BC output pulses on line 106.

The output start signal on lead 616 from the A/D and FIFO register circuit 603 of FIG. 8 is introduced through a "nor" gate 906 to an oscillator 901. The frequency of the oscillator is adjusted by a potentiometer 902. The output of oscillator 901 is applied to a counter 903, and the outputs of the counter are applied by leads 909 to logic circuit 907.

The hold signal on lead 122 of FIG. 6 is applied to an inverter 904, the input of which is connected to a grounded resistor 905. The BC start signal which is introduced to the brightness control generator circuit 605 of FIG. 6 is produced by logic circuit 907 on the lead 621, and the BC pulse from the brightness control generator are applied to the differential line driver 908J over lead 622. The data for the right-most module column is supplied on lead 107, and the data for the left-most module column is supplied on leads 110. Data from the right-most module column FIFO register of FIG. 8 is applied to differential driver 908H on lead 619, and data from the left-most module column FIFO register in FIG. 6 is applied to differential line driver 908A over lead 620.

Figure 9:
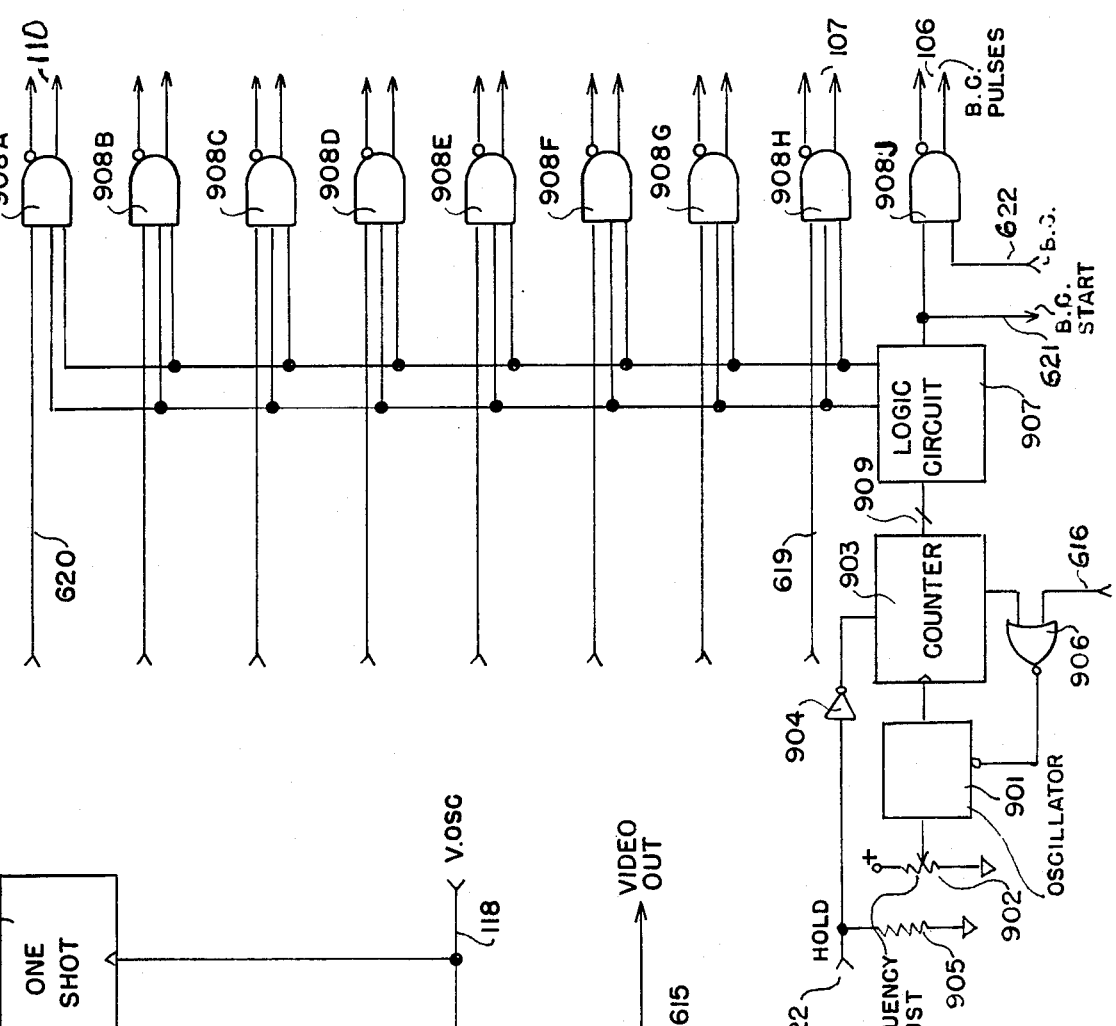
FIG. 9 is an output circuit included in the video digitier of FIG. 6.

The output circuit 604 of FIG. 9 controls the removal of data in serial form from each serial-to-parallel register 812 of FIG. 8, and the output circuit formats the outputs into self-clocking data, and combines with each 120-bit stream a bit controlling whether the module is to enter the data into memory to allow the modules to continue to display the data previously placed in each memory of each module, or whether the data currently being generated is to be entered into the memory.

The output cycle is initiated by an output start pulse on lead 616, and is terminated after the final count (127th) of counter 903. The oscillator frequency is set by potentiometer 920 so that the cycle is completed in less than the allotted time (127 microseconds on the time of two consecutive television lines).

The logic circuit 907 operates the data line drivers 908A-908H to format the data, and it provides the BC start pulse to initiate the operation of the BC generator 605 of FIG. 6. The line driver 908J accepts BC pulses on lead 22 from the BC pulses on lead 622 from the B.C. generator 605 to generate the complete B.C. signal on leads 106 which is delivered to all the modules of the display.

Figure 10:
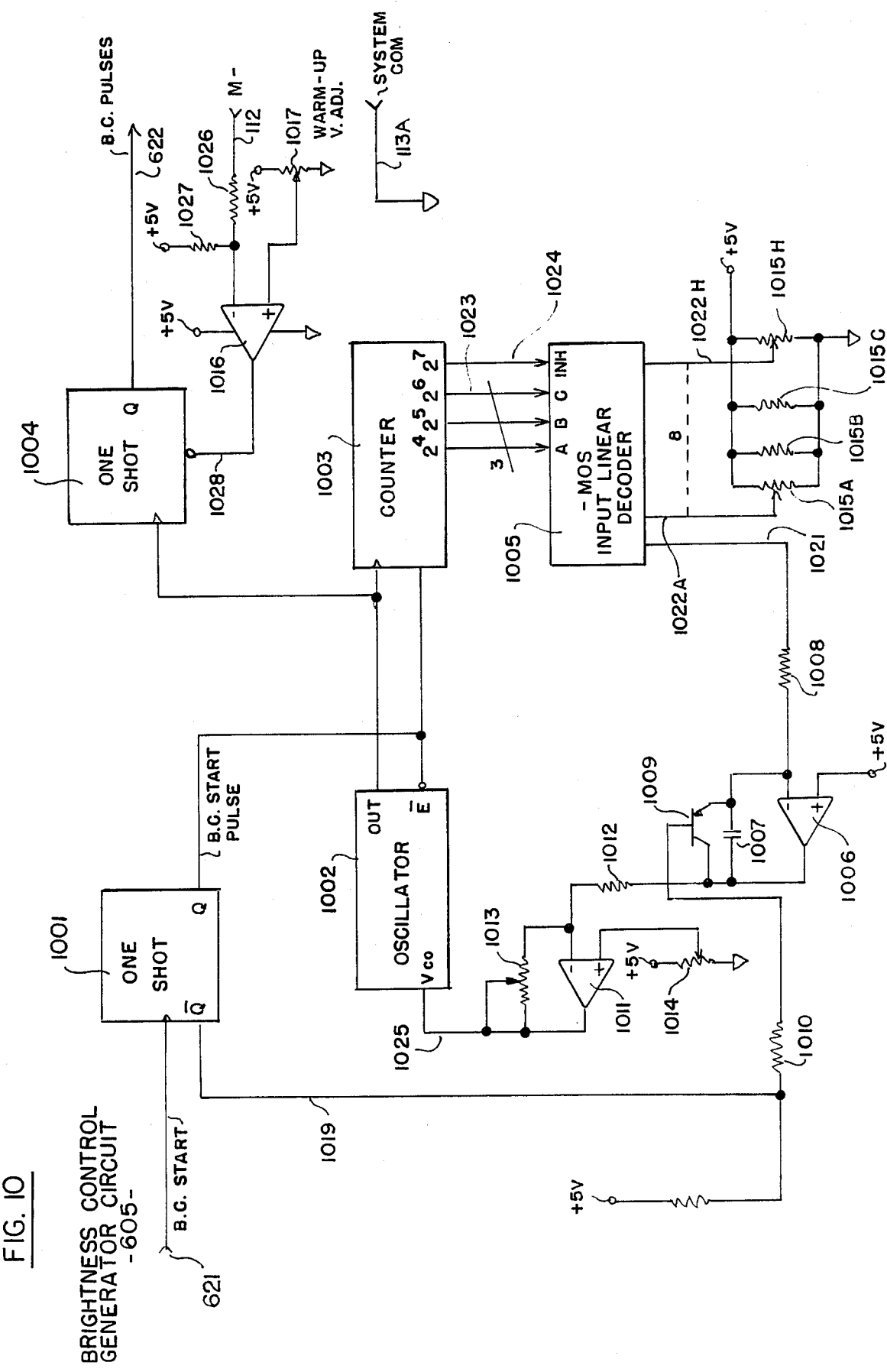
FIG. 10 is a brightness control generator included in the video digitizer of FIG. 6.

The brightness control generator 605 of FIG. 6 is shown in more detail in FIG. 10. The brightness control generator 605 of FIG. 10 includes a 5 microsecond one-shot 1001 which supplies a BC start pulse to the reset teminals of a voltage controlled oscillator 1002 and a 7-bit counter 1003. The output of oscillator 1002 is introduced to counter 1003 and to the input of a 200 nanosecond one-shot 1004. Counter 1003 is connected to a C-MOS 8-input linear decoder 1005 which may be of the type designated CD4051. The counter 1003 is connected to the C-MOS linear decoder 1005 over a series of leads 1023 which provide 3-bit addresses to the decoder, and over a lead 1024 which provides an inhibit signal to the decoder.

The linear output from decoder 1005 is introduced over lead 1021 and through an integrator input resistor 1008 to an integrator operational amplifier 1006. The amplifier 1006 is shunted by a capacitor 1007 and by a reset transistor 1009. The base of transistor 1009 is connected through a base drive resistor 1010, and through a further resistor to the positive terminal of the 5-volt voltage source.

Operational amplifier 1006 is also connected to an the negative input of an operational amplifier 1011 through a resistor 1012. Potentiometer 1013 serves as a feedback potentiometer for amplifier 1011. The positive input of amplifier 1011 is connected to the wiper of a potentiometer 1014 which provides a start frequency adjustment. The output of amplifier 1011 is connected to the VCO input of oscillator 1002.

A series of potentiometers 1015A-1015H are provided which serve as integrator slope adjustments for the linear decoder 1005, and provide inputs to the linear decoder over leads 1022A-1022H.

Amplifier 1016 is connected as a comparator, and its output is connected to the $\overline{\text{CLEAR}}$ input of one-shot 1004 over lead 1028. The one-shot 1004 generates the B.C. pulses at its $\overline{Q}$ output terminal. The M- lead 112 is connected through a resistor 1026 to the negative input of the comparator 1016, and that input is also connected through a resistor 1027 to the positive terminal of the 5-volt source. The positive input of the comparator is connected to a potentimeter 1017 which provides a warm-up voltage adjustment.

The brightness control generator 605 of FIG. 10 generates a series of pulses at a varying rate when initiated by the BC start pulse received from the video output circuit 604 of FIG. 6 over lead 621, and these pulses are passed back to the output circiit over lead 622, and they serve to control the highly non-linear luminoscity versus power characteristics of the incandescent lamps 208 of FIG. 2 so that the brightness for each lamp corresponds with the brightness of the corresponding point of the original scene being displayed.

One-shot 1001 stops oscillator 1002, and resets the integrator 1006 by the $\overline{Q}$ output signal on lead 1019 which renders transistor 1009 conductive. Oscillator 1002 advances counter 1003, and the counter addresses the decoder 1005. As stated, decoder 1005 is a linear decoder which connects one of eight selected settings of potentiometers (1015A-1015H) to input leads 1022A-1022H. After all eight potentiometers have been addressed, the most significant bit from counter 1003, received over lead 1024, causes all inputs to be disconnected, presenting a zero current signal on the output lead 1021 through resistor 1008. This output signal is integrated by the integrator consisting of the operational amplifier 1006, resistor 1008 and capacitor 1007. The output of the integrator is an increasing voltage, the voltage increasing with time at a rate determined by the setting of the potentiometers 1015A-1015H selected by decoder 1005. After all eight potentiometers have been selected, the integrator output remains constant until reset by the signal received from one-shot 1001 over lead 1019.

The output of integrator 1006 is amplified by operational amplifier 1011 so that a curved function signal decreasing with time is presented to the VCO input of oscillator 1002 over lead 1025. Potentiometer 1014 allows adjustment of the DC levels of which the output on lead 1025 starts and finishes, and potentiometer 1013 serves an adjustment of the amplitude of the curve of the signal. Oscillator 1002 generates output pulses which are introduced to one-shot 1004 which, in turn, introduces short duration BC pulses over lead 622 to the output circuit 604 of FIG. 6. Comparator 1016 serves to inhibit the output of the one-shot 1004 whenever the M- voltage on lead 112 becomes less negative than some value determined by the setting of potentiometer 1017. The output of amplifier 1016 to the $\overline{\text{CLEAR}}$ input of one-shot 1004 stops the pulses on lead 622. The setting of the potentiometer 1017 is such that when the M- voltage is at the normal full value for operating the display, BC pulses are generated. However, when the M- voltage is at a value occurring during the first 2 seconds after energizing the power supply, and while the system is in a warm-up mode, the B.C. pulses on lead 622 are inhibited.

This means that no BC pulses are present in the modules to operate the pulse width counters during warm-up. This causes the pulse width to be the maximum value during warm-up so that for two seconds the lamp filaments are warmed up by the lower supply voltage. Accordingly, when the power supply goes to full voltage, the lamp drivers are not overstressed by applications of voltages to cold tungsten filaments.

In this connection, the requirement for operation of the display is such that the resistance of the filaments when the lamps are at minimum brightness is not less than one-half the resistance of the filaments when the lamps are at maxium brightness. The peak current carried by the lamp drivers is then at the worst case (minimum light brightness) less than two times the peak current carried by the drivers when the lamps are at maxium brightness.

It will be appreciated that while a particular embodiment of the invention has been shown and described, modifications may be made. It is intended in the claims to cover all modifications which come within the true spirit and scope of the invention.

I claim:

1. Apparatus for displaying a video picture in response to a received video signal formed of successive vertical fields each containing successive horizontal lines of video information, said display apparatus comprising: a plurality of discrete modules arranged in rows and columns and interconnected to one another, with each module including a matrix array of light emitting elements arranged in a plurality of rows and columns; a video digitizer circuit responsive to a received video signal for converting the received video signal into digital data signals representing different shade levels of the received video signal and for producing said digital data signals at each of a plurality of output terminals, and including a brightness control generator circuit for producing brightness clock pulses at a further output terminal; circuitry connected to said plurality of output terminals of said video digitizer circuit and to said modules for supplying said digital data signals at respective ones of said plurality of output terminals to successive columns of said modules and for supplying said brightness clock pulses at said further output terminal to all of said modules; and a module board included in each of said modules including converte circuitry responsive to the brightness clock pulses received from said brightness control generator for converting the digital data signals from a corresponding one of said output terminals of said digitizer into width-modulated pulses, and including electronic drive circuitry connected to said columns of the light emitting elements of the matrix array contained therein to supply the width-modulated pulses thereto to control the brightness of said light emitting elements, said module board including address circuitry for supplying drive signals to said rows of light emitting elements to activate said rows in succession; a first power supply connected to the circuitry in said module boards of said modules for supplying a first direct current voltage to the circuitry of said module boards and a second power supply connected to the light emitting elements of said modules to supply a second direct current voltage to the light emitting elements.

2. The apparatus defined in claim 1, in which the drive signals supplied by said module board to said light emitting elements are current source type to minimize the effect of voltage transients.

3. The apparatus defined in claim 1, in which said module board in each of said modules contains a memory; first circuitry for causing the digital data signals received from said video digitizer circuit to be stored in said memory in response to a first control signal; and second circuitry for introducing the data signals from said memory to said converter circuitry in each of said modules in response to a second control signal.

4. The apparatus defined in claim 1, and which includes a third relatively low voltage power supply connected to said light emitting elements of said matrix of each of said modules; switching means connected to said third power supply for causing said third power supply to supply a relatively low warm-up current to said light emitting elements when said switching means is operated; control circuitry connected to said second power supply and to said switching means for causing said second power supply to supply a relatively high current to said light emitting elements a predetermined interval after said first power supply is energized; blocking means interposed in the output of said third power supply for blocking current therefrom when said second power supply is energized; and circuitry included in said video digitizer circuit for inhibiting the production of said brightness clock pulses by said brightness control generator circuit during intervals when said third power supply is supplying warm-up current to said light emitting elements.

5. The apparatus defined in claim 1, and which includes a monitor responsive to said received video signal for displaying a video corresponding to the picture displayed by the display apparatus, said monitor being connected to said video digitizer circuit for supplying synchronizing signals thereto for synchronizing the video digitizer circuit with the received video signal.

6. The apparatus defined in claim 1, and which includes a control unit including a white level potentiometer and a dark level potentiometer connected to said video digitizer circuit to set the range of shades of said received video signal represented by said digital data signals.

7. The apparatus defined in claim 1, in which said brightness control generator produces said brightness clock pulses at a variable rate to compensate for nonlinearities in the light output of the light emitting elements with respect to applied electrical power.

8. The apparatus defined in claim 7, in which said light emitting elements are incandescent lamps.

* * * * *